(12) United States Patent
Moore et al.

(10) Patent No.: US 11,115,225 B2
(45) Date of Patent: Sep. 7, 2021

(54) REMOTE HOME ROUTER COMMUNICATION VIA SET-TOP BOX

(71) Applicant: Verizon Patent and Licensing Inc., Arlington, VA (US)

(72) Inventors: Matthew Moore, Zelienople, PA (US); Alan Rompala, Coraopolis, PA (US); Alex M. Madonna, Spring Lake Heights, NJ (US); Eric M. Ndungu, Franklin Park, NJ (US); Kevin Foster, Denton, TX (US); Srinivasu Yelamarti, Flower Mound, TX (US); Hashmatullah Azizi, Haymarket, VA (US); Venkata Chaluvadi, Fishkill, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 121 days.

(21) Appl. No.: 16/689,601

(22) Filed: Nov. 20, 2019

(65) Prior Publication Data

US 2021/0152378 A1 May 20, 2021

(51) Int. Cl.
| | | |
|---|---|---|
| *G06F 15/16* | (2006.01) |
| *H04L 12/12* | (2006.01) |
| *H04L 12/28* | (2006.01) |
| *H04L 12/715* | (2013.01) |
| *H04L 12/46* | (2006.01) |
| *H04N 21/436* | (2011.01) |

(52) U.S. Cl.
CPC .......... *H04L 12/12* (2013.01); *H04L 12/2834* (2013.01); *H04L 12/4616* (2013.01); *H04L 45/04* (2013.01); *H04N 21/43615* (2013.01)

(58) Field of Classification Search
CPC . H04L 12/12; H04L 12/4616; H04L 12/2843; H04L 45/04
See application file for complete search history.

(56) References Cited

U.S. PATENT DOCUMENTS

| | | | |
|---|---|---|---|
| 9,716,623 B2 * | 7/2017 | Cooppan | H04L 41/0809 |
| 2011/0257769 A1 * | 10/2011 | Lee | H04L 12/2809 |
| | | | 700/90 |
| 2013/0151893 A1 * | 6/2013 | Gorecha | G06F 11/0748 |
| | | | 714/15 |
| 2015/0341216 A1 * | 11/2015 | Cooppan | H04L 41/0809 |
| | | | 709/221 |
| 2019/0007847 A1 * | 1/2019 | Abramovitz | H04L 41/069 |
| 2019/0173741 A1 * | 6/2019 | Hieb | H04L 12/12 |

* cited by examiner

*Primary Examiner* — Hieu T Hoang

(57) ABSTRACT

A set-top box (STB) receives a router reboot or reset activation code generated by an Operations Support System (OSS) that manages a first network. The STB activates a router reboot or reset function based on the received activation code, and identifies, upon activation of the router reboot or reset function, a model of a router connected to the STB. The STB generates a router reboot or reset command based on the identified model of the router and sends the generated router reboot or reset command to the router to cause the router to perform a reboot or reset process.

20 Claims, 6 Drawing Sheets

REMOTE HOME ROUTER COMMUNICATION VIA SET-TOP BOX

BACKGROUND

Network customers, such as customers of a cable network (e.g., an optical fiber cable network, such as Verizon's Fiber Optic Service (FiOS) network), very often subscribe to Internet service, in addition to cable television programming service, as a component of their network service subscription. To receive television (TV) programming or content as part of a customer's network service subscription, a set-top box is typically installed at the premises of the customer and connected to the cable network. The set-top box tunes to channels on the cable network to receive TV programming/ content and provide the programming/content to a connected display device (e.g., a monitor or TV). To enable Internet service, a home router is typically installed at the premises of the customer and also connected to the cable network. One or more devices, such as computers or "smart" phones, may then connect to the home router, via a wired or wireless local area network (e.g., a Wi-Fi network), and engage in data sessions, via the home router, with destinations in the Internet.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

A common problem reported by network service customers, such as, for example, cable network customers, is that they are unable to connect to the Internet via their home router. The first troubleshooting step for such a problem is to reboot (i.e., power cycle) the home router or, in some cases, perform a factory reset of the home router. Normally, the customer support center representative would have the capability to reboot or factory reset the home router remotely. However, if the home router is in an "offline" condition, such as currently having no Internet Protocol connectivity, then the customer support center representative will be unable to remotely reboot or factory reset the home router. The only remaining option then is for the customer support center representative to verbally communicate the steps to the customer to have the customer manually re-boot or factory reset the home router. Successful completion of this manual process is entirely dependent on the customer properly executing the manual procedure. Evaluation of field technician dispatch remarks, and home routers returned for repair by customers, has shown that, in a significant number of instances, the reboot or reset claimed to have been performed by the customer during the manual process did not in fact occur. The evaluation further determined that, if the manual reboot or factory reset had been performed as instructed by the customer support center representative, dispatch of the field technician, or return of the home router for repair, could have been avoided.

Exemplary embodiments described herein enable remote control of a home router, including a remote-initiated reboot or factory reset of the home router, in circumstances where the home router is in an "offline" condition and has no Internet connectivity. As described herein, when the customer associated with the home router also has a set-top box (STB) at the customer premises, a customer support center representative may perform a preliminary procedure that causes, for example, an Operations Support System (OSS) to initiate a remote reboot or factory reset from the STB over a network that connects the home router and the STB. The OSS causes the STB to send control commands to the home router to trigger a reboot or factory reset of the home router, as described in further detail below. Embodiments described herein enable the customer support center representative to remotely invoke a reboot or reset of a home router, via a STB, so as to avoid the customer having to attempt to manually reboot or reset the home router at the customer premises.

Figure 1:
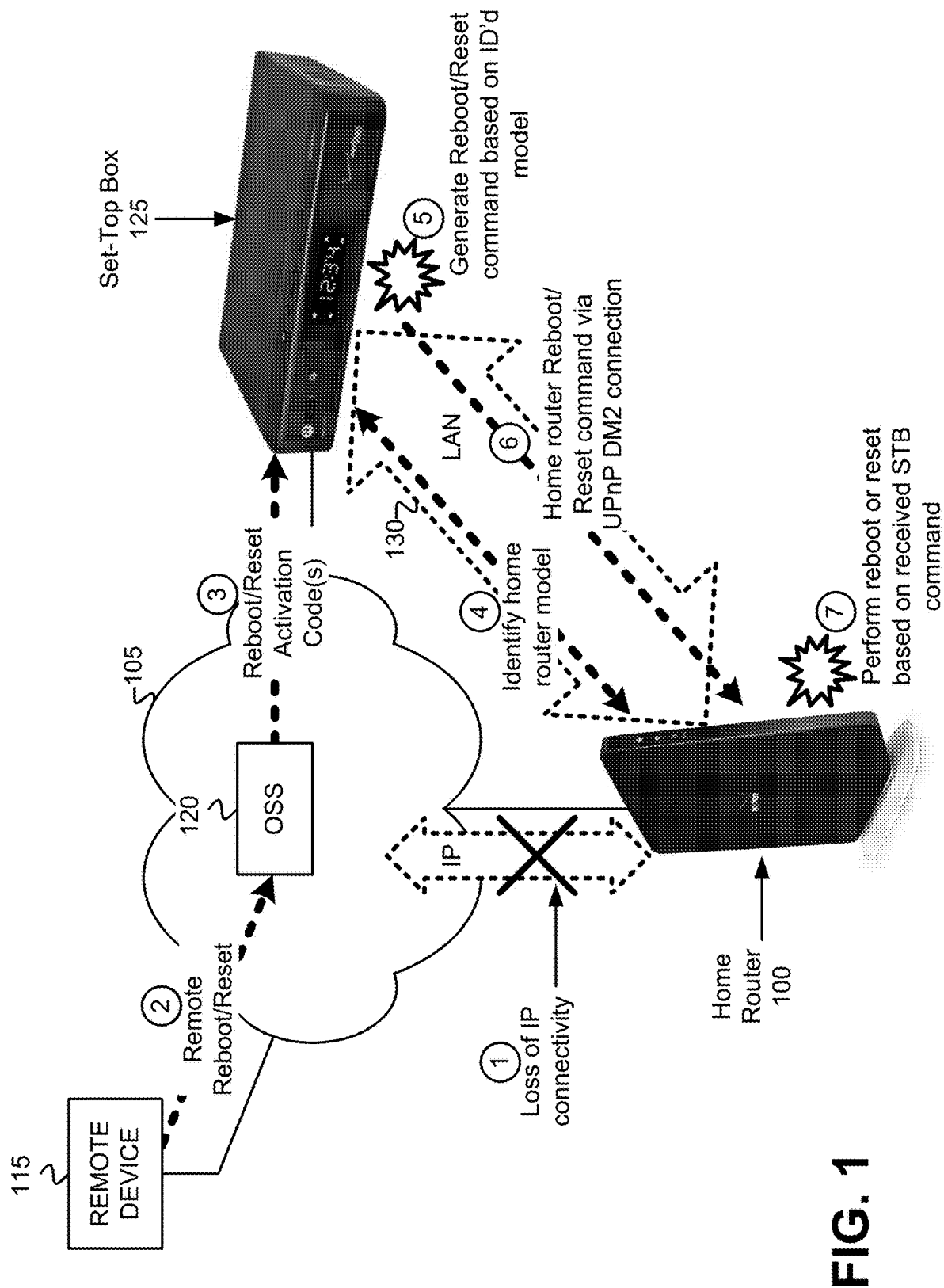
FIG. 1 illustrates an overview of remote-initiated reboot or reset of a home router, via a set top box residing at a same customer premises as the home router, in circumstances where the home router has lost Internet connectivity.

FIG. 1 illustrates an overview of remote-initiated reboot or reset of a home router, via a STB residing at a same customer premises, in circumstances where the home router is in an "offline" condition and has lost Internet connectivity. As shown, loss of Internet Protocol (IP) connectivity (identified with a "1" within a circle) may occur at a home router 100 at a customer premises. Home router 100 may connect to a network service provider's network 105. Loss of IP connectivity between home router 100 and network 105 may occur for various reasons, such as, for example, hardware failure, etc. A customer support center representative may, in response to the loss of IP connectivity at home router 100, invoke a remote reboot or reset process, involving home router 100, from a remote device 115. The remote device 115 may include a computational device, such as a computer or smart phone, that can communicate with network 105. The remote device 115 may send a remote reboot or reset request (identified with a "2" within a circle) to an OSS 120 associated with the network 105 for rebooting or resetting an identified home router 100.

Upon receipt of the reboot/reset request, OSS 120 identifies, based on customer records, a STB 125 that resides at a same customer premises as home router 100 and which further connects to home router 100 via, for example, a local area network (LAN) 130. STB 125 includes a device that tunes among channels on network 105 to acquire and lock to specific channels to enable content transmitted on those channels to be displayed on a display device(s) (e.g., a television, not shown) connected to STB 125.

OSS 120 sends a reboot/reset activation code(s) (identified with a "3" within a circle) to the identified STB 125. In some implementations, OSS 120 may include a digital addressable controller (DAC) that sends the reboot/reset activation code(s) to the STB 125. In other implementations, the DAC may reside in, or at, a headend (not shown) of network 105. STB 125 activates a reboot or reset function based on receipt of the reboot or reset activation code, and then identifies a model of home router 100. In one implementation (identified with a "4" within a circle), STB 125 may query the home router 100 to obtain the model information from home router 100 across LAN 130. In another implementation (not shown in FIG. 1), STB 125 may retrieve the model number for home router 100 from locally stored data, or from remotely stored data via network 105.

STB 125 may generate (identified with a "5" within a circle) a reboot or reset command based on the identified model of home router 100. In one implementation, STB 125 may perform a data lookup, based on the identified model of home router 100, to retrieve a reboot command or a reset command that is specific to the particular model of home router 100. STB 125 may send (identified with a "6" within a circle) the generated reboot or reset command across LAN 130 to home router 100. In one implementation, STB 125 may send the reboot or reset command via a Universal Plug and Play (UPnP) Device Management 2 (DM2) connection across LAN 130. Subsequent to receipt of the reboot or reset command from STB 125, home router 100 may perform a reboot or reset process (identified with a "7" within a circle) in accordance with the reboot or reset command received from STB 125.

OSS 120, upon sending the reboot or reset activation code(s) to STB 125 (previously identified with a "2"), may initiate a timer that has a configurable time period. For example, the timer may be configured to have a duration of 100 seconds. When the timer expires (e.g., upon reaching the end of the configurable time period), OSS 120 may deactivate the previously activated reboot or reset functions at STB 125 to disable remote rebooting or resetting of home router 100 via STB 125.

Figure 2:
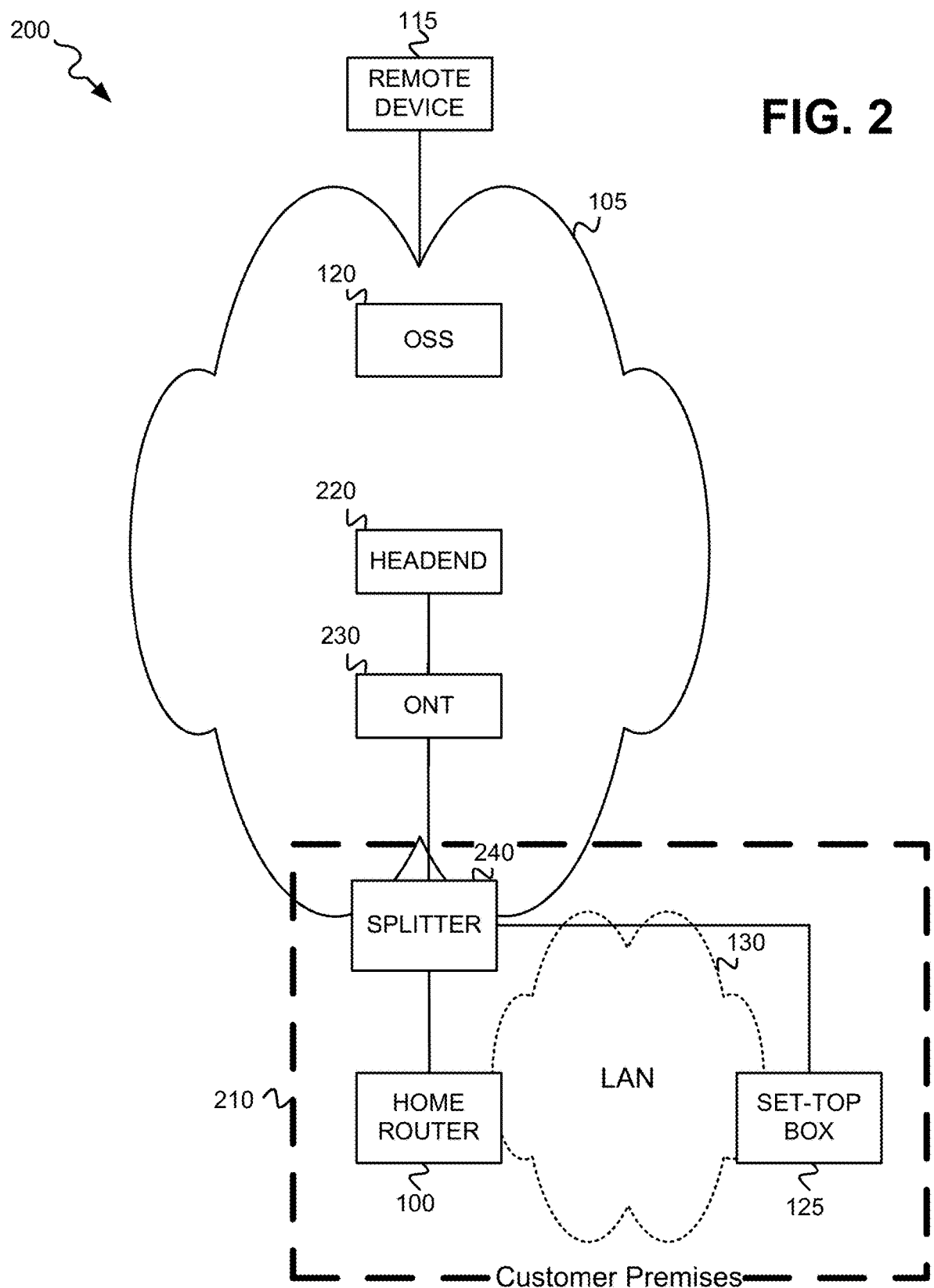
FIG. 2 illustrates an exemplary network environment in which remote rebooting or resetting of a home router, via a set top box, may be implemented.

FIG. 2 illustrates an exemplary network environment 200 in which remote rebooting or resetting of home router 100, via STB 125, may be implemented. As shown, network environment 200 may include remote device 115, network 105, and a customer premises 210.

Remote device 115 may include any type of computational device that can communicate via network 105, such as, for example, a computer (e.g., desktop, laptop, tablet, or wearable computer), a personal digital assistant (PDA), a cellular phone (e.g., a "smart" phone), or a Voice over Internet Protocol (VoIP) phone.

Network 105 may include any type of network, or a combination of networks, that provides packet-switched (e.g., Internet) connectivity with home router 100, and which further provides connectivity and content (e.g., video programming) to STB 125 via one or more channels. In one implementation, network 105 may include, among other networks, a cable network, such as, for example, a fiber optic cable network. In some implementations, the channels may include, for example, Quadrature Amplitude Modulated (QAM), Quadrature Phase Shift Keying (QPSK), or Internet Protocol (IP) Television (IPTV) channels. In other implementations, the channels may include an Out of Band (OOB) channel(s). Network 105 may further include, for example, the Internet, a LAN(s), a wide area network(s) (WAN), or a metropolitan area network (MAN). Network 105 may include various components for providing packet-switched connectivity with home router 100, and for providing content to STB 125. As shown in the exemplary network environment 200 of FIG. 2, network 105 may include OSS 120, a headend 220, and an optical network terminal (ONT) 230.

OSS 120 includes one or more network devices that monitor, control, analyze, and manage network services provided by network 105 (e.g., services provided by the cable network). OSS 120 supports management functions such as network inventory, service provisioning, network configuration, and fault management. OSS 120 may operate automatically based on input provided by a network administrator, or may operate manually in accordance with commands provided by the network administrator.

Headend 220 includes one or more network devices that receive signals containing content and decode, multiplex, encode, and transmit the signals containing the content to ONT 230 via modulators. Headend 220 may transmit the signals over a fiber optic line to ONT 230 using optical signals.

ONT 230 includes a device that terminates the fiber optic line and converts optical signals to electrical signals, and vice versa. ONT 230 transmits the converted electrical signals to splitter 240 for further provision to home router 100 and STB 125. ONT 230 may transmit the converted electrical signals to customer premises 210 using QAM, QPSK, or OOB signals.

Customer premises 210 includes a customer's residence or business location. As shown, customer premises 210 may include a home router 100, a STB 125, and a splitter 240. Home router 100 may connect to network 105 via splitter 240. In implementations in which home router 100 and STB 125 are separate devices, STB 125 may connect to home router 100 via splitter 240 and LAN 130. In some implementations, home router 100 and STB 125 may be integrated as a single device and may connect via internal communication pathways (e.g., via a bus). Splitter 240 includes circuitry for splitting the electrical signals from ONT 230 to home router 100 and STB 125. Coaxial cable, for example, may be used to connect the split output from splitter 240 to both home router 100 and STB 125.

The configuration of network components of network environment 200 illustrated in FIG. 2 is for illustrative purposes only. Other configurations may be implemented. Therefore, network environment 200 may include additional, fewer and/or different components than those depicted in FIG. 2. For example, though only a single customer premises 210 is shown in FIG. 2, multiple customer premises 210, that each includes a home router 100 and a STB 125, may connect to network 105. A different splitter and/or ONT 230 may be associated with each of the multiple customer premises 210.

Figure 3:
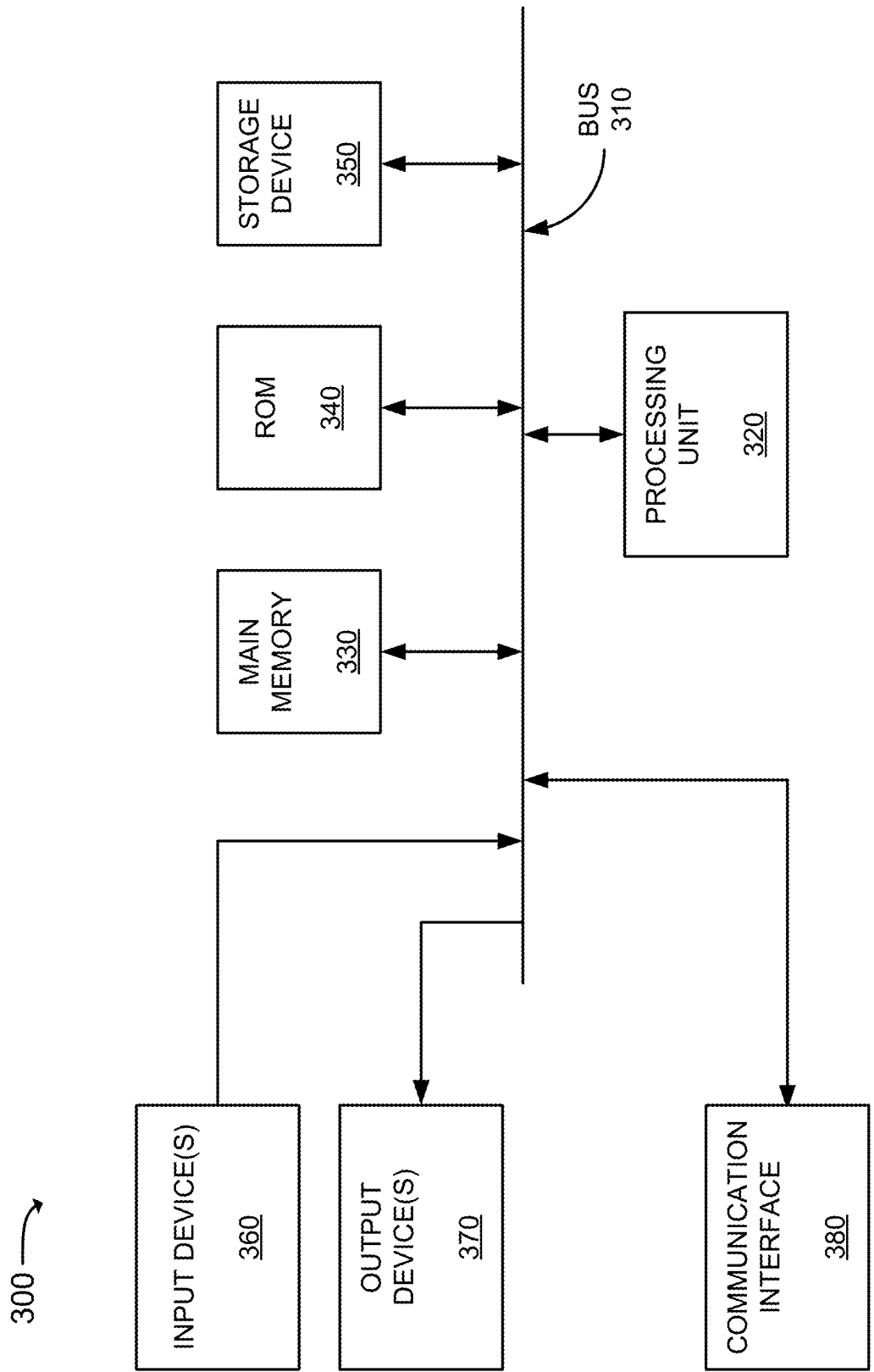
FIG. 3 is a diagram that depicts exemplary components of a device that may correspond to the remote device, Operations Support System, and home router of FIG. 2.

FIG. 3 is a diagram that depicts exemplary components of a device 300. Remote device 115, OSS 120, and home router 100 may be configured the same as, or similar to, device 300. Device 300 may include a bus 310, a processing unit 320, a main memory 330, a read only memory (ROM) 340, a storage device 350, an input device(s) 360, an output device (s) 370, and a communication interface 380. Bus 310 may include a path that permits communication among the elements of device 300.

Processing unit 320 may include one or more processors or microprocessors which may interpret and execute instructions. Additionally, or alternatively, processing unit 320 may include processing logic that executes one or more operations of a process(es).

Main memory 330 may include a random access memory (RAM) or another type of dynamic storage device that may store information and, in some implementations, instructions for execution by processing unit 320. ROM 340 may include a ROM device or another type of static storage device (e.g., Electrically Erasable Programmable ROM (EEPROM)) that may store static information and, in some implementations, instructions for use by processing unit 320. Storage device 350 may include a magnetic, optical, and/or solid state (e.g., flash drive) recording medium and its corresponding drive. Main memory 330, ROM 340 and storage device 350 may each be referred to herein as a "non-transitory computer-readable medium" or a "non-transitory storage medium." The processes/methods set forth herein may, at least in part, be implemented as instructions that are stored in main memory 330, ROM 340 and/or storage device 350 for execution by processing unit 320.

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the operator, including a display, a speaker, etc. Communication interface 380 may include one or more transceivers that enable device 300 to communicate with other devices and/or systems. For example, communication interface 380 may include wired and/or wireless transceivers for communicating via network 105.

The configuration of components of device 300 illustrated in FIG. 3 is for illustrative purposes only. Other configurations may be implemented. Therefore, device 300 may include additional, fewer and/or different components than those depicted in FIG. 3.

Figure 4:
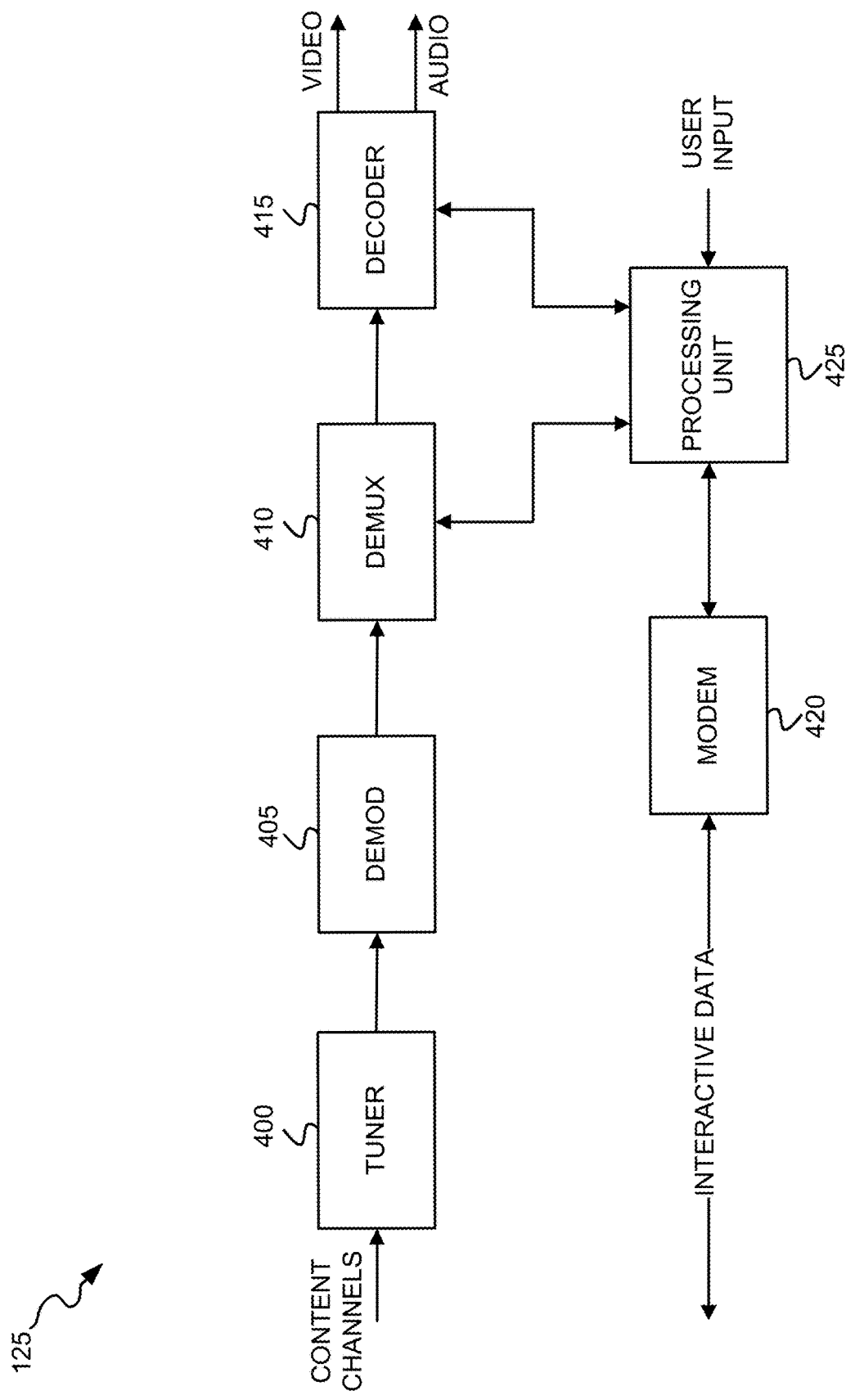
FIG. 4 depicts exemplary components of the set top box of FIGS. 1 and 2.

FIG. 4 depicts exemplary components of STB 125. STB 125 may include a tuner 400, a demodulator 405, a demultiplexer 410, a decoder 415, a processing unit 425, and a modem 420.

Tuner 400 may select specific broadcast television content or programming by tuning to one of many different input channels. Each channel may be digitally modulated using, for example, quadrature amplitude modulation (though other types of modulation may be used). Demodulator 405 may demodulate the information in the channel selected by tuner 400 to produce a transport stream (e.g., MPEG-2 or MPEG-4 transport stream) containing the audio, video and/or other information related to the selected TV program.

Demultiplexer 410 may select and decrypt compressed audio and video from the transport stream for the particular TV program that the STB user wishes to watch. Decoder 415 may decode and decompress the decrypted audio and video information for the selected TV program. Processing unit 425 may include, for example, a microprocessor that controls the operations performed by tuner 400, demodulator 405, demultiplexer 410, and decoder 415 based on user input. Modem 420 may send and receive interactive data (e.g., digital program guide information), or other data, that may be processed by processing unit 425.

The configuration of components of STB 125 illustrated in FIG. 4 is for illustrative purposes only. Other configurations may be implemented. Therefore, STB 125 may include additional, fewer and/or different components than those depicted in FIG. 4. For example, STB 125 may include a memory device for storing instructions and applications for execution by processing unit 425. The memory device may include any type of memory device, similar to memory 330, ROM 340, and/or storage device 350 described above with respect to FIG. 3. The operations set forth herein as being performed by STB 125 may, in some implementations, be implemented as instructions that are stored in the memory device for execution by processing unit 425 of STB 125.

Figure 5:
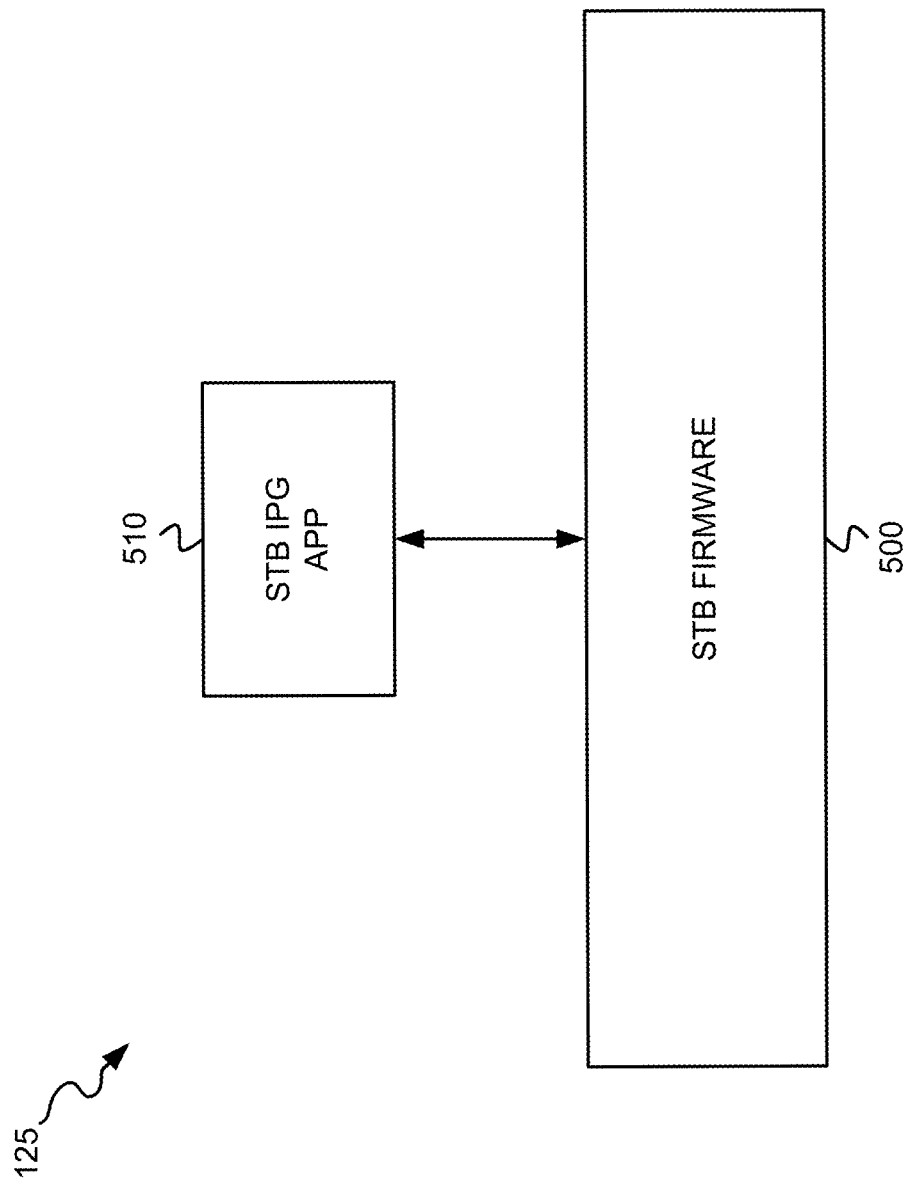
FIG. 5 depicts exemplary functional components of the set top box of FIGS. 1 and 2.

FIG. 5 depicts exemplary functional components of STB 125. The functional components of STB 125 shown in FIG. 5 may be implemented by processing unit 425 of FIG. 4. As shown in FIG. 5, the functional components of STB 125 may include STB firmware 500 and a STB interactive programming guide (IPG) application (app) 510.

STB firmware 500 may include functionality for controlling the basic operations of STB 125, including the internal operations associated with changing to a new channel, such as, for example, tuning to a QAM frequency, locating a multiplexed program stream, obtaining authorization, etc. STB firmware 500 may additionally include functionality for processing activation codes received from OSS 120, such as reboot and/or reset activation codes. STB firmware 500 may notify STB IPG app 510 of the received activation codes.

STB IPG app 510 receives the activation codes from STB firmware 500 and activates the corresponding functions within IPG app 510. For example, the activation codes may include a reboot activation code and/or a factory reset activation code. STB IPG app 510 may, upon activation of the reboot or reset functions, identify a model of a connected home router 100, and then generate a router reboot or reset command based on the received activation code and the identified home router model. STB IPG app 510 sends the generated home router reboot or reset command, via an available UPnP DM2 connection across LAN 130, to home router 100 for execution of a reboot or factory reset process.

Figure 6:
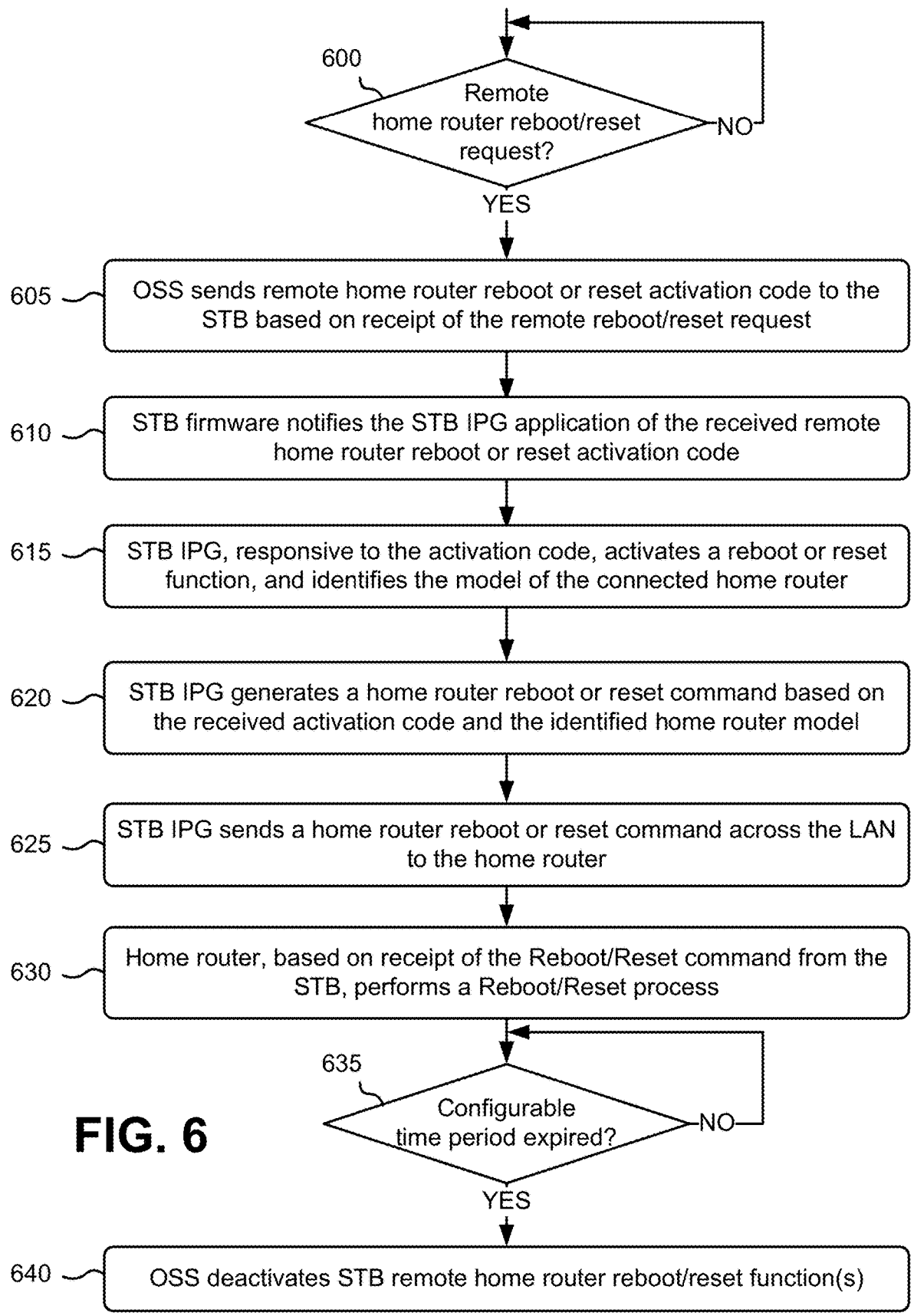
FIG. 6 is a flow diagram that illustrates an exemplary process for remotely invoking a home router reboot or factory reset using a set top box.

FIG. 6 is a flow diagram that illustrates an exemplary process for remotely invoking a home router 100 reboot or factory reset using a STB 125. The exemplary process of FIG. 6 may be implemented by STB 125, in conjunction with OSS 120 and home router 100.

The exemplary process may include OSS 120 determining if a remote home router reboot or reset request has been received from remote device 115 (block 600). For example, a customer support center representative may receive a customer service call from a customer associated with customer premises 210. During the customer service call, the customer may notify the customer support center representative that the customer is unable to access the Internet via home router 100 at the customer premises 210. In response, customer support center representative, using remote device 115, may send a remote home router reboot or reset request for home router 100 to OSS 120.

OSS 120 sends a remote home router reboot or reset activation code to STB 125 based on receipt of the remote reboot or reset request (block 605). Upon receipt of the home router reboot or reset request from remote device 115, OSS 120 identifies the STB 125 residing at a same customer premises at the home router 100 that is to be rebooted or reset. OSS 120 then obtains a home router reboot activation code that corresponds to the reboot request, or a home router factory reset activation code that corresponds to the reset request, and sends the reboot activation code or factory reset activation code to STB 125 via network 105. ONT 230 may send signals, corresponding to the reboot activation code or factory reset activation code received from OSS 120, to customer premises 210 using, for example, QAM, QPSK, or OOB signals.

Firmware 500 of STB 125 notifies the IPG application 510 of the received remote home router reboot or reset activation code (block 610). Firmware 500, upon receipt of the reboot or reset activation code from OSS 120, forwards the activation code to STB IPG app 510. The IPG application 510 of STB 125, in response to receipt of the activation code(s), activates a reboot or reset function, and identifies the model of the connected home router 100 (block 615). The IPG application 510 activates a reboot function based on receipt of a reboot activation code, or activates a factory reset function based on receipt of a reset activation code.

Upon activation of the reset or reboot function, the activated function identifies the model of the connected home router 100 at customer premises 210 that is to be rebooted or reset. STB 125 may retrieve the model number from locally stored data (e.g., data stored in a data structure in memory at STB 125) or from remotely stored data (e.g., stored in a data structure of a memory device connected to network 105). Alternatively, STB 125 may query home router 100 for the router 100's model number, and/or other device information. Upon receipt of the request, home router 100 replies with model number information for router 100 and/or other device information.

The IPG application 510 of STB 125 generates a home router reboot or reset command based on the received activation code and the identified home router model (block 620). The IPG application 510 of STB 125 may, for example, perform a lookup into locally stored data, or remotely stored data, to retrieve a particular reboot or reset command that is appropriate for the identified model of STB 125 and corresponds to the received activation code. For example, a model_$x_1$ of STB 125 and a received activation code_$y_1$ may map to a reboot command_$z_1$.

The IPG application 510 of STB 125 sends the generated home router reboot or reset command across LAN 130 to home router 100 (block 625). In one implementation, the IPG application 510 of STB 125 may send the home router reboot or reset command via an available UPnP DM2 connection across LAN 130 to home router 100. In implementations in which STB 125 and home router 100 are integrated as a single device, IPG application 510 may send the home router reboot or reset command via, for example, an internal bus to home router 100. Home router 100, based on receipt of the reboot/reset command from STB 125, performs a reboot/reset process (block 630). If a reboot command is received by home router 100 from STB 125, then home router 100 initiates a reboot process to shut down and restart home router 100. If a factory reset command is received by home router 100 from STB 125, then home router 100 initiates a reset process that restores home router 100 to its original manufacturer settings. The reset process may include, for example, erasing previous data and settings stored on home router 100.

OSS 120 determines if a configurable time period has expired since sending the reboot/reset activation codes to STB 125 (block 635). OSS 120 may implement a timer that keeps track of an elapsed time since OSS 120 has sent a remote home router reboot or reset activation code (i.e., sent in block 605) to STB 125 for rebooting or resetting home router 100. If the configurable time period has expired (YES—block 635), then OSS 120 deactivates STB 125's remote home router reboot/reset function(s) (block 640). When the timer at OSS 120 reaches the time period (e.g., 100 seconds), OSS 120 sends a command to STB 125 at customer premises 210 to cause STB 125 to deactivate the previously activated home router reboot or reset functions. Once deactivated, the home router reboot or reset functions are disabled at STB 125. OSS 120 repeats block 635 (NO—block 635), until the configurable time period has expired.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 6, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a set-top box (STB), a router reboot or reset activation code generated by an Operations Support System (OSS) that manages a first network;
    activating, at the STB, a router reboot or reset function based on the received activation code;
    identifying, by the STB upon activation of the router reboot or reset function, a model of a router connected to the STB;
    generating, by the STB, a router reboot or reset command based on the identified model of the router; and
    sending, by the STB, the generated router reboot or reset command to the router to cause the router to perform a reboot or reset process.

2. The method of claim 1, wherein the STB and the router are integrated as a single device.

3. The method of claim 1, wherein sending the generated reboot or reset command further comprises:
    sending, via a Universal Plug and Play (UPnP) Device Management 2 (DM2) connection, the reboot or reset command to the router.

4. The method of claim 1, wherein the router is connected to the STB via a second network and wherein the router reboot or reset command is sent by the STB to the router via the second network.

5. The method of claim 4, wherein the reboot or reset activation code is generated by the OSS based on a reboot or reset request originating from a remote device that is not connected to the second network.

6. The method of claim 4, wherein the second network comprises a local area network (LAN) and wherein the router comprises a home router residing at a customer premises.

7. The method of claim 1, wherein the STB comprises a device that receives an external signal and obtains, from the signal, content for display by a display device.

8. A set top box (STB), comprising:
    a memory device; and
    a processing unit, or logic, to:
        receive a router reboot or reset activation code generated by an Operations Support System (OSS) that manages a first network, activate a router reboot or reset function based on the received activation code;

identify, upon activation of the router reboot or reset function, a model of a router connected to the STB, generate a router reboot or reset command based on the identified model of the router, and send the generated router reboot or reset command to the router to cause the router to perform a reboot or reset process.

9. The STB of claim 8, wherein the STB and the router are integrated as a single device.

10. The STB of claim 8, wherein, when sending the generated reboot or reset command, the processing unit, or logic is further to:

send the reboot or reset command to the router via a Universal Plug and Play (UPnP) Device Management 2 (DM2) connection.

11. The STB of claim 8, wherein the router is connected to the STB via a second network and wherein the router reboot or reset command is sent by the STB to the router via the second network.

12. The STB of claim 11, wherein the reboot or reset function activation code is generated by the OSS based on a reboot or reset request originating from a remote device that is not connected to the second network.

13. The STB of claim 11, wherein the second network comprises a local area network (LAN) and wherein the router comprises a home router residing at a customer premises.

14. The STB of claim 8, wherein the STB comprises a device that receives an external signal and obtains, from the signal, content for display by a display device.

15. A non-transitory storage medium storing instructions executable by a set top box (STB), wherein the instructions comprise instructions to cause the STB to:

receive a router reboot or reset activation code generated by an Operations Support System (OSS) that manages a first network;

activate a router reboot or reset function based on the received activation code;

identify, upon activation of the router reboot or reset function, a model of a router connected to the STB;

generate a router reboot or reset command based on the identified model of the router; and send the generated router reboot or reset command to the router to cause the router to perform a reboot or reset process.

16. The non-transitory storage medium of claim 15, wherein the STB and the router are integrated as a single device.

17. The non-transitory storage medium of claim 15, wherein the instructions to cause the STB to send the generated reboot or reset command further instructions to cause the STB to:

send the reboot or reset command to the router via a Universal Plug and Play (UPnP) Device Management 2 (DM2) connection.

18. The non-transitory storage medium of claim 15, wherein the router is connected to the STB via a second network and wherein the router reboot or reset command is sent by the STB to the router via the second network.

19. The non-transitory storage medium of claim 18, wherein the reboot or reset activation code is generated by the OSS based on a reboot or reset request originating from a remote device that is not connected to the second network.

20. The non-transitory storage medium of claim 18, wherein the second network comprises a local area network (LAN) and wherein the router comprises a home router residing at a customer premises.

* * * * *